(12) United States Patent
Suzuki et al.

(10) Patent No.: US 7,766,110 B2
(45) Date of Patent: Aug. 3, 2010

(54) VEHICLE HAVING IN-WHEEL MOTORS

(75) Inventors: Yasuhiro Suzuki, Tokyo (JP); Katsumi Tashiro, Tokyo (JP); Hisashi Kurokawa, Tokyo (JP); Yoshinari Nakamura, Tokyo (JP); Kimio Takahashi, Tokyo (JP)

(73) Assignees: Kabushiki Kaisha Bridgestone, Tokyo (JP); Kayaba Industry Co., Ltd., Tokyo (JP); Akebono Brake Industry Co., Ltd., Tokyo (JP)

( * ) Notice: Subject to any disclaimer, the term of this patent is extended or adjusted under 35 U.S.C. 154(b) by 973 days.

(21) Appl. No.: 11/547,264

(22) PCT Filed: Apr. 4, 2005

(86) PCT No.: PCT/JP2005/006617

§ 371 (c)(1),
(2), (4) Date: Oct. 4, 2006

(87) PCT Pub. No.: WO2005/097534

PCT Pub. Date: Oct. 20, 2005

(65) Prior Publication Data

US 2008/0283315 A1    Nov. 20, 2008

(30) Foreign Application Priority Data

Apr. 5, 2004 (JP) .............................. 2004-111525

(51) Int. Cl.
*B60K 1/00* (2006.01)
(52) U.S. Cl. .............................. 180/65.51; 180/65.31
(58) Field of Classification Search .............. 180/65.51, 180/65.1, 65.31, 446; 280/124.1, 124.135
See application file for complete search history.

(56) References Cited

U.S. PATENT DOCUMENTS

| 5,087,229 | A  | * | 2/1992  | Hewko et al. ............ 180/65.51 |
| 6,364,078 | B1 | * | 4/2002  | Parison et al. ............... 188/380 |
| 6,863,149 | B2 | * | 3/2005  | Shimizu ..................... 180/446 |
| 7,072,751 | B2 | * | 7/2006  | Shimizu ....................... 701/36 |
| 7,118,119 | B2 | * | 10/2006 | Amanuma ........... 280/124.135 |
| 7,121,367 | B2 | * | 10/2006 | Ajiro et al. ............... 180/65.51 |

(Continued)

FOREIGN PATENT DOCUMENTS

EP        1 702 784 A1      9/2006

(Continued)

*Primary Examiner*—Hau V Phan
(74) *Attorney, Agent, or Firm*—Sughrue Mion, PLLC

(57) ABSTRACT

A vehicle having in-wheel motors, wherein when the in-wheel motors are mounted on the vehicle driven by the torque of an internal combustion engine, the in-wheel motors are mounted on wheels on one side of the vehicle opposite to the other side on which the internal combustion engine is mounted. The non-rotating side of the motor and the knuckle are supported by a buffer mechanism having plates connected to each other by a direct-acting guide with springs composed of a direct-acting guide having a linear bearing and a rod and spring members moving in the vertical direction of the vehicle and mated with the direct-acting guide and a damper for interconnecting the plates, moving in the vertical direction of the vehicle to support the motor to either one or both of the unsprung mass of the vehicle and the car body by the buffer mechanism. Thus, the running ability and riding comfort of the vehicle having in-wheel motors can be improved.

2 Claims, 9 Drawing Sheets

U.S. PATENT DOCUMENTS

| | | |
|---|---|---|
| 7,537,071 B2 * | 5/2009 | Kamiya .................. 180/65.51 |
| 7,559,389 B2 * | 7/2009 | Yamashita ............... 180/65.31 |
| 2005/0247496 A1 | 11/2005 | Nagaya |
| 2007/0144801 A1 | 6/2007 | Suzuki et al. |

FOREIGN PATENT DOCUMENTS

| | | |
|---|---|---|
| JP | 61-191526 U | 11/1986 |
| JP | 03-110214 U | 12/1991 |
| WO | 02-083446 A1 | 10/2002 |
| WO | 2004-020236 A1 | 3/2004 |
| WO | 2005-061257 A1 | 7/2005 |

* cited by examiner

VEHICLE HAVING IN-WHEEL MOTORS

BACKGROUND OF THE INVENTION

1. Field of the Invention

The present invention relates to a vehicle having in-wheel motors and, particularly, to the arrangement of in-wheel motors and an internal combustion engine in a vehicle having an internal combustion engine for driving the vehicle.

2. Description of the Prior Art

As a vehicle having an internal combustion engine for driving front wheels or rear wheels, there has been known a vehicle having auxiliary driving motors in which the front wheels or the rear wheels are driven by an internal combustion engine and auxiliary driving electric motors are mounted to the rear wheels or front wheels to assist the driving force of the vehicle. FIG. 9(a) shows an example of a vehicle 60 having rear wheel auxiliary driving motors. In the vehicle 60 having rear wheel auxiliary driving motors, a generator 63 is mounted to an internal combustion engine 62 for driving the front wheels 60F and 60F, and auxiliary driving electric motors (in-wheel motors) 64 are mounted to the rear wheels 60R and 60R and are driven by power generated from the above generator 63 to drive the rear wheels 60R and 60R so as to assist the drive force of the above vehicle 60 (see Patent Document 1, for example).

FIG. 9(b) shows an example of an electric motor as the above electric motor, a motor 64 M having a speed reducer is often used. This motor 64M is a inner rotor type motor which comprises a stator 64S fixed to a motor case 64a on the outer side and a rotor 64R fixed to a motor shaft 64c through a support member 64b on the inner side. The above motor shaft 64c is rotatably supported by a bearing 64d installed in the motor case 64a and a bearing 64g installed in the carrier 64f of a planetary gear type speed reducer 64e, and the shaft 64h of the above carrier 64f which is the output shaft of the above speed reducer 64e is rotatably connected to the output shaft of a unshown clutch to transfer a torque.

As a direct drive type in-wheel motor having no speed reducer, there is proposed an outer rotor type in-wheel motor 73 as shown in FIG. 10 (see Patent Document 2, for example). In this in-wheel motor 73, a stator 73S is connected and supported to an upright 77 which is a fixing unit and arranged on the inner side of the wheel disk 72b of a direct drive wheel 72 and connected to a rotary shaft 74 connected to the above wheel disk 72b through a bearing 74J. Since a rotor 73R arranged on the outer side of the above stator 73S is supported to a first bracket 75a connected to the above rotary shaft 74 and a second bracket 75b connected to the above upright 77 through a bearing 77J in such a manner that it can turn, the rotor 73R is rotatably connected to the stator 73S. Therefore, as torque can be transmitted to the above wheel 72 by driving the above in-wheel motor 73, the above wheel 72 can be directly driven.

Motor control having excellent response which cannot be realized with a motor having a speed reducer like the above motor 64M can be realized by mounting a direct drive type in-wheel motor like the above motor 73.

Patent Document 1: JP-A 2003-32806

Patent Document 2: Japanese Patent No. 2676025

SUMMARY OF THE INVENTION

Although the vehicle having rear wheel auxiliary driving motors of the prior art has high space efficiency because a power transmission mechanism for transmitting power from an internal combustion engine to the rear wheels is not required, as in-wheel motors are mounted to the unsprung mass of the vehicle directly, or motors are fixed to a spindle shaft connected to an upright or a knuckle which is one of parts around the wheel of the vehicle, the above unsprung mass is increased by the mass of the motors. When the unsprung mass increases, a change in the ground load of each tire when running on an uneven road becomes larger, thereby deteriorating the road holding properties, that is, road follow-up properties of the tire. As a result, a phenomenon that the tire leaps from the road when the road is a little rough occurs, thereby reducing the ground load of the tire. When the ground load of the tire decreases, maximum allowable drive force applied to the tire also decreases, whereby the applied drive force becomes smaller in the vehicle having in-wheel motors of the prior art than a vehicle having ordinary wheels.

Therefore, in the vehicle having an internal combustion engine mounted on the front side of the car body to drive the front wheels, when in-wheel motors are fixed to the unsprung mass of the rear wheels, as the sprung mass becomes large and the unsprung mass becomes small on the front wheel side, the ground holding force of each tire is large. On the other hand, as the sprung mass becomes small and the unsprung mass becomes large on the rear wheel side, the same drive force cannot be distributed to the front wheels and the rear wheels, thereby reducing running ability. Further, as vibration above the spring increases, riding comfort deteriorates.

In a vehicle having an internal combustion engine mounted on the rear side of the car body to drive the rear wheels and in-wheel motors mounted to the unsprung mass of the front wheels, unlike the above vehicle having auxiliary driving in-wheel motors mounted to the rear wheels, the unsprung mass becomes small on the rear wheel side and the unsprung mass becomes large on the front wheel side. Therefore, also in this case, the same drive force cannot be distributed to the front wheels and the rear wheels, thereby reducing running ability and riding comfort.

It is an object of the present invention which has been made to solve the above problem of the prior art to improve the running ability and riding comfort of a vehicle having in-wheel motors by optimizing the arrangement of in-wheel motors to be mounted to the wheels and an internal combustion engine to be mounted to the car body.

The inventors of the present invention have conducted intensive studies and have found that both the unsprung mass on the front wheel side and the unsprung mass on the rear wheel side can be made small when the mounting positions of in-wheel motors and an internal combustion engine are optimized and the mass of the in-wheel motors is separated from the unsprung mass of the vehicle to serve as the mass of a dynamic damper, paying attention to the fact that, on a side where the internal combustion engine is mounted, a change in the ground load of each tire is not so large when the in-wheel motors are mounted to wheels as the unsprung mass is relatively small whereas, on a side where the internal combustion engine is not mounted, a change in the ground load of each tire is large when the in-wheel motors are mounted as the unsprung mass is relatively large. The present invention has been accomplished based on this finding.

That is, according to a first aspect of the present invention, there is provided a vehicle having in-wheel motors, comprising an internal combustion engine for driving the vehicle, mounted on either the front side or the rear side of the car body and electric motors mounted to wheels, wherein the in-wheel motors are mounted to wheels on a side opposite to the side where the internal combustion engine is mounted and supported to either one or both of the unsprung mass of the vehicle and the car body by a buffer mechanism.

According to a second aspect of the present invention, there is provided a vehicle having in-wheel motors, wherein the internal combustion engine is mounted on the front side of the car body to drive the front wheels, and the in-wheel motors drive the rear wheels.

According to a third aspect of the present invention, there is provided a vehicle having in-wheel motors, wherein the internal combustion engine is mounted on the rear side of the car body to drive the rear wheels, and the in-wheel motors drive the front wheels.

According to a fourth aspect of the present invention, there is provided a vehicle having in-wheel motors, wherein wheels on a side where the internal combustion engine is mounted are driven by torque generated from the internal combustion engine.

According to a fifth aspect of the present invention, there is provided a vehicle having in-wheel motors, wherein a generator which turns by torque generated from the internal combustion engine is provided to drive wheels on a side where the internal combustion engine is mounted by its generated power.

According to a sixth aspect of the present invention, there is provided a vehicle having in-wheel motors, wherein a generator which turns by torque generated from the internal combustion engine is provided to drive the in-wheel motors by its generated power.

According to a seventh aspect of the present invention, there is provided a vehicle having in-wheel motors, wherein the internal combustion engine is the main drive source and the in-wheel motors are auxiliary drive sources.

According to an eighth aspect of the present invention, there is provided a vehicle having in-wheel motors, wherein the buffer mechanism comprises a plurality of plates which are interconnected by a direct-acting guide mechanism and spring members and a damper for interconnecting the adjacent plates.

According to a ninth aspect of the present invention, there is provided a vehicle having in-wheel motors, wherein the buffer mechanism comprises (1) two plates which are interconnected by a direct-acting guide with springs composed of a direct-acting guide member consisting of a linear bearing and a rod and spring members mated with the direct-acting guide and whose moving directions are limited to the vertical direction of the vehicle and (2) a damper for interconnecting the two plates, moving in the vertical direction of the vehicle.

According to a tenth aspect of the present invention, there is provided a vehicle having in-wheel motors, wherein the two plates are a knuckle attachment plate connected to the knuckle and a motor attachment plate connected to the non-rotating side case of the motor, a fixing member for fixing the linear bearing which is a fixing portion of the direct-acting guide is provided on the knuckle attachment plate, receiving members for receiving the both ends of the rod which is a movable portion of the direct-acting guide are provided on the motor attachment plate to mount the direct-acting guide, and the spring members are interposed between the fixing member and the receiving members.

EFFECT OF THE INVENTION

According to the present invention, in the vehicle having an internal combustion engine and in-wheel motors, the internal combustion engine is mounted on the front side of the vehicle to drive the front wheels and the in-wheel motors supported to at least one of the unsprung mass of the vehicle and the car body by a buffer mechanism drive the rear wheels, or the internal combustion engine is mounted on the rear side of the vehicle to drive the rear wheels and the in-wheel motors supported to one of the unsprung mass of the vehicle and the car body by the buffer mechanism drive the front wheels. Therefore, on a side where the internal combustion engine is mounted, the sprung mass is increased by the weight of the internal combustion engine whereas on a side opposite to the side where the internal combustion engine is mounted, the in-wheel motors are float mounted to a part around the wheel of the vehicle and the mass of the motors serves as the mass of a dynamic damper. Therefore, the unsprung mass is reduced, thereby making it possible to improve the ground holding performance of the front wheels and the rear wheels as well as the running ability and riding comfort of the vehicle having in-wheel motors.

As the above buffer mechanism, there is provided a structure such that adjacent plates interconnected by a direct-acting guide mechanism are further interconnected by spring members and damper.

Particularly when the above buffer mechanism comprises (1) two plates which are interconnected by a direct-acting guide with springs composed of a direct-acting guide comprising a linear bearing and a rod and spring members mated with the direct-acting guide and whose directions are limited to the vertical direction of the vehicle and (2) a damper for interconnecting the two plates, moving in the vertical direction of the vehicle, the buffer mechanism for supporting the motors can be reduced in size while required elastic properties and attenuation characteristics are retained. Thereby, the vertical movement stroke of the motor can be fully ensured and the whole wheel can be reduced in size, whereby a vehicle having in-wheel motors having excellent running ability and riding comfort can be realized and a vehicle having in-wheel motors with high space efficiency can also be realized.

DETAILED DESCRIPTION OF THE PREFERRED EMBODIMENTS

Preferred embodiments of the present invention will be described hereinunder with reference to the accompanying drawings.

Figure 1:
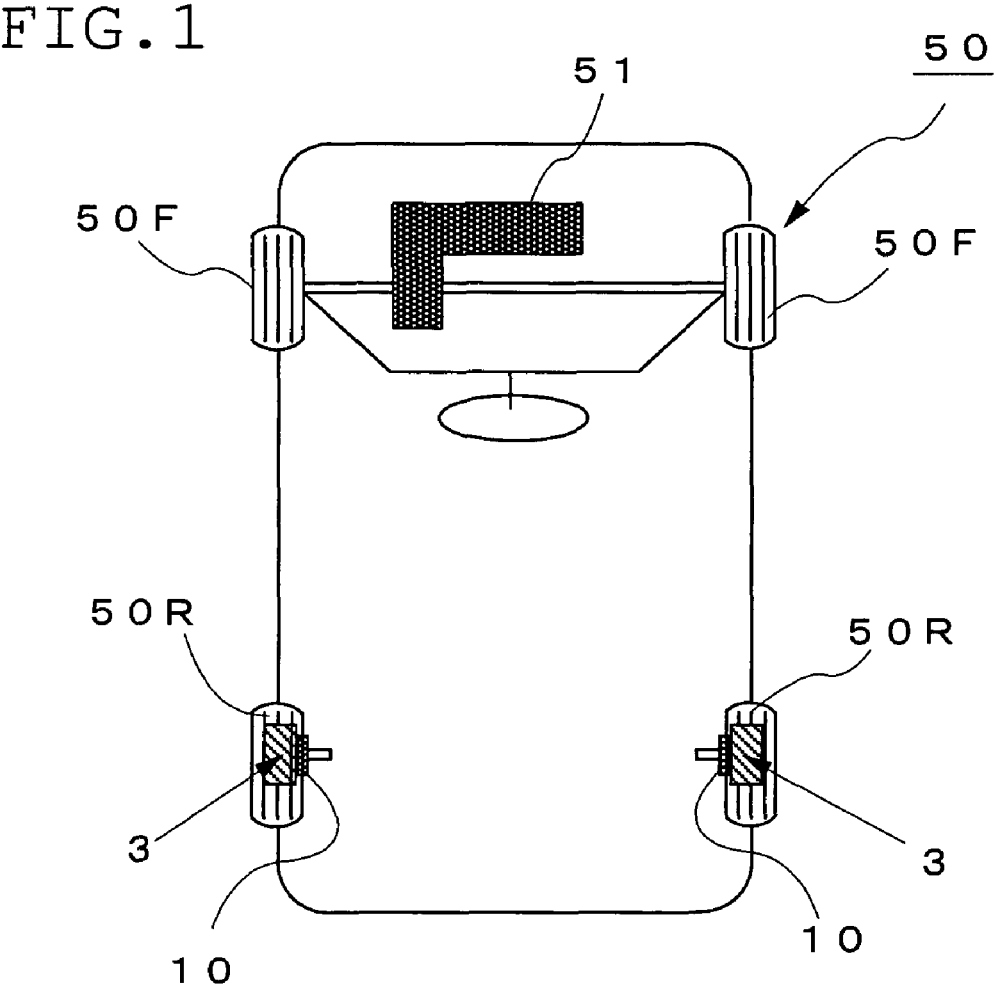
FIG. 1 is a diagram showing the outline of a vehicle having rear wheel auxiliary driving motors according to an embodiment of the present invention.

FIG. 1 is a diagram showing the outline of a vehicle 50 having rear wheel auxiliary driving motors according to a preferred embodiment of the present invention. In the vehicle 50 having rear wheel auxiliary driving motors, an internal combustion engine 51 is mounted on the front side of the vehicle to drive front wheels 50F and 50F and auxiliary driving in-wheel motors 3 are mounted to rear wheels 50R and 50R to drive the rear wheels 50R and 50R. In this embodiment, the above in-wheel motors 3 are connected to the non-rotating sides (vehicle unsprung mass) of the rear wheels 50R and 50R by buffer mechanisms 10.

Figure 2:
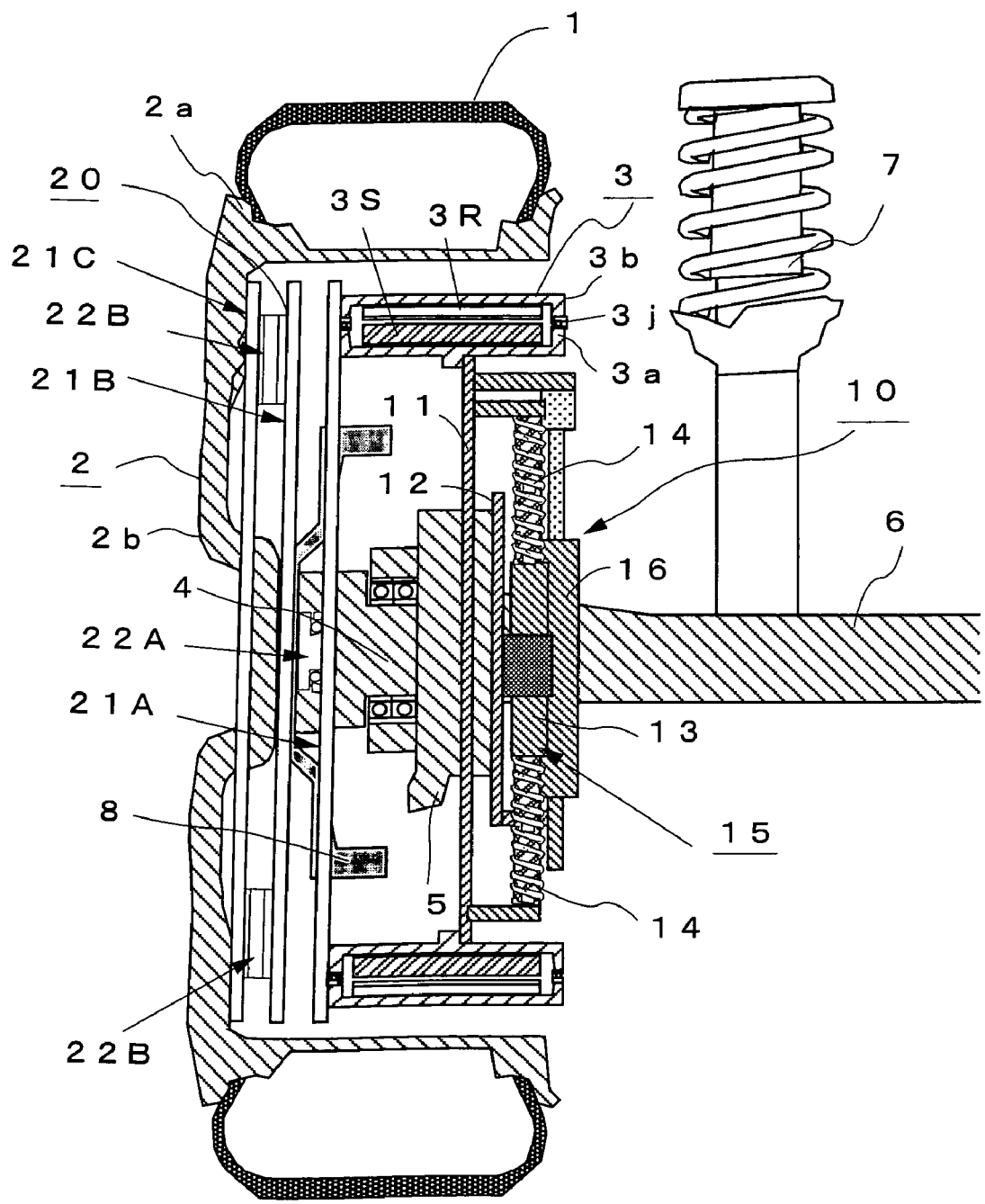
FIG. 2 is a diagram showing the constitution of the rear wheel of the vehicle having rear wheel auxiliary driving motors according to the embodiment of the present invention.

FIG. 2 shows the details of the rear wheel to which the above in-wheel motor 3 is mounted. In FIG. 2, reference numeral 1 denotes a tire, 2 a wheel comprising a rim 2a and a wheel disk 2b, 3 an outer rotor type in-wheel motor which comprises a stator 3S fixed to a non-rotating side case 3a arranged on the inner side in the radial direction and a rotor 3R fixed to a rotating side case 3b rotatably connected to the above non-rotating side case 3a through a bearing 3j and arranged on the outer side in the radial direction, 4 a hub connected to the wheel 2 at its rotary shaft, 5 a knuckle connected to an axle 6, 7 a suspension member composed of a shock absorber, and 8 a brake unit composed of a brake disk mounted to the above hub 4.

Reference numeral 10 represents a buffer mechanism for connecting the non-rotating side case 3a of the motor to the knuckle 5, comprising (1) a motor attachment plate 11 connected to the non-rotating side case 3a of the motor 3, (2) a knuckle attachment plate 12 attached to the above axle 6, (3) a direct-acting guide 15 with springs composed of a direct-acting guide member 13 for guiding the above motor attachment plate 11 and the above knuckle attachment plate 12 in the vertical direction of the vehicle and spring members 14 which expand and contract in the moving direction of the above direct-acting guide member 13 and are mated with the direct-acting guide member 13, and (4) a damper 16 which expands and contracts in the moving direction of the above direct-acting guide 15 with springs, and 20 a flexible coupling for connecting the rotating side case 3b of the above motor 3 to the wheel 2, comprising a plurality of hollow disk-like plates 21A to 21C and direct-acting guides 22A and 22B arranged in such a manner that their moving directions are orthogonal to each other.

Figure 3:
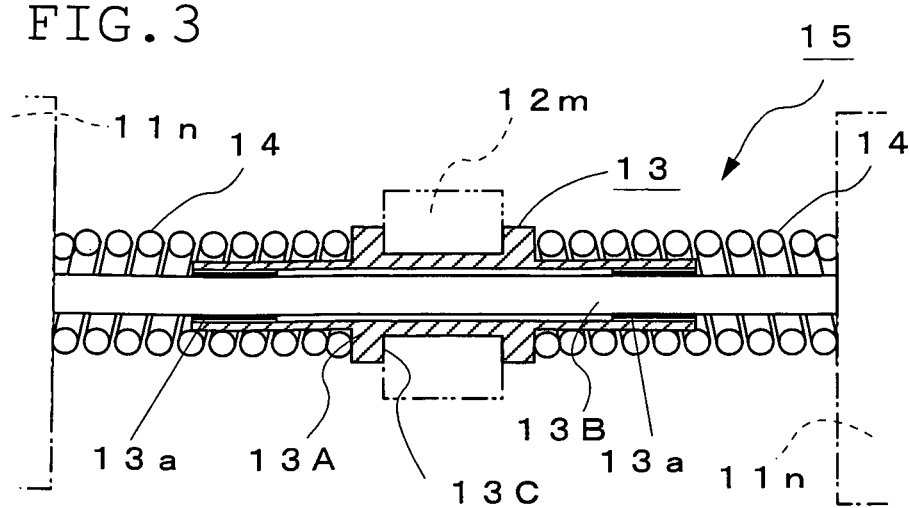
FIG. 3 is a diagram showing the constitution of a direct-acting guide with a spring according to the present invention.

As shown in FIG. 3, the direct-acting guide 15 with springs is composed of (1) the direct-acting guide member 13 which consists of a linear bearing 13A having two linear ball bearings 13a and 13a arranged in series on the inner side and a rod 13B moving linearly and fitted with the linear bearing 13A and (2) the spring members 14 and 14 arranged on the outer side of the above rod 13B of the direct-acting guide member 13. An attachment groove 13C for fixing this direct-acting guide 15 with springs to a fixing member 12m which will be described hereinafter is formed in the center portion on the outer side of the above linear bearing 13A.

Figure 4:
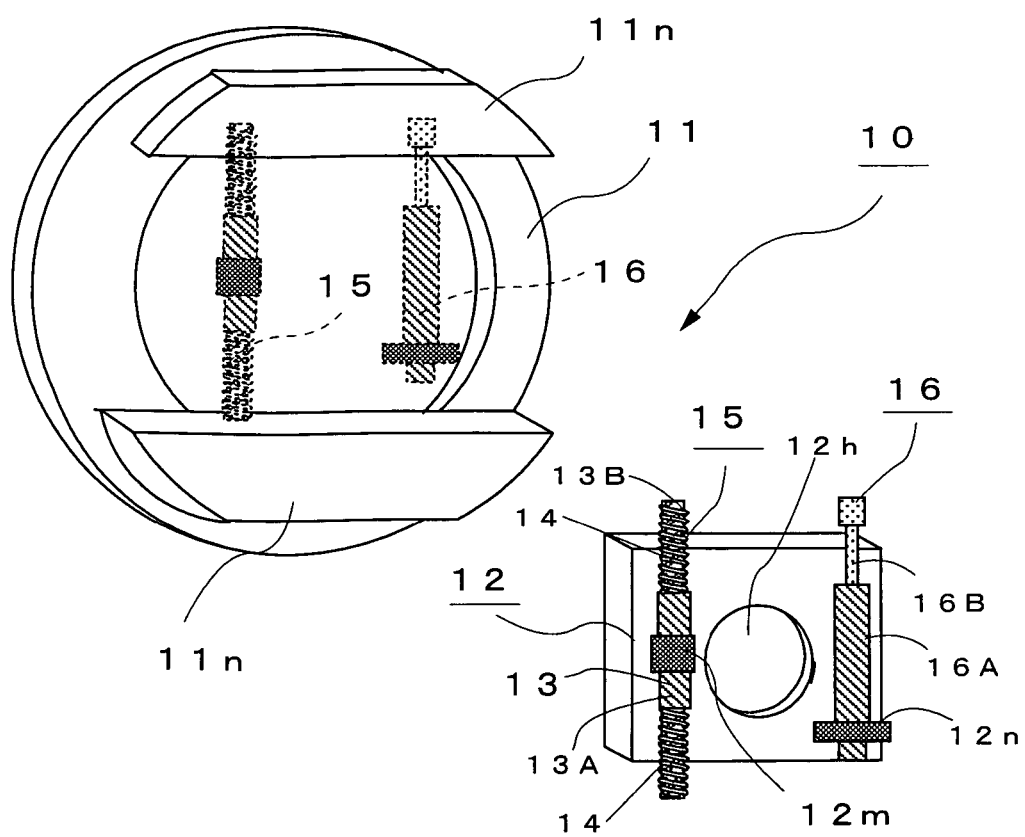
FIG. 4 is a diagram showing the constitution of a buffer mechanism according to the present invention.

In this embodiment, as shown in FIG. 4, the linear bearing 13A which is the fixing portion of the above direct-acting guide 15 with springs is fixed in the fixing member 12m mounted on one side of a connection hole 12h for the axle 6 formed in the knuckle attachment plate 12, and the fixing portion 16A of the damper 16 is fixed in a fixing member 12n mounted on the other side of the connection hole 12h. Receiving members 11n and 11n are installed at positions corresponding to the both ends of the rod 13B which is the movable part of the direct-acting guide 15 with springs of the motor attachment plate 11 on the motor 3 side, the both ends of the above rod 13B are connected to the receiving members 11n and 11n, and the end of the movable portion 16B of the above damper 16 is connected to one of the above receiving members 11n. Since the above spring members 14 and 14 are arranged on the outer side of the above rod 13B, they can be easily mounted in such a manner that they can expand and contract in the vertical direction of the vehicle, and the above direct-acting guide member 13 and the above spring members 14 and 14 can be installed between the motor attachment plate 11 and the knuckle attachment plate 12 at the same time.

Thereby, the above motor attachment plate 11 and the knuckle attachment plate 12 are guided in the vertical direction of the vehicle by the above direct-acting guide member 13 and interconnected by the spring members 14 and the damper 16, whereby the in-wheel motor 3 can be moved only in the vertical direction while attenuation force is generated.

Figure 5:
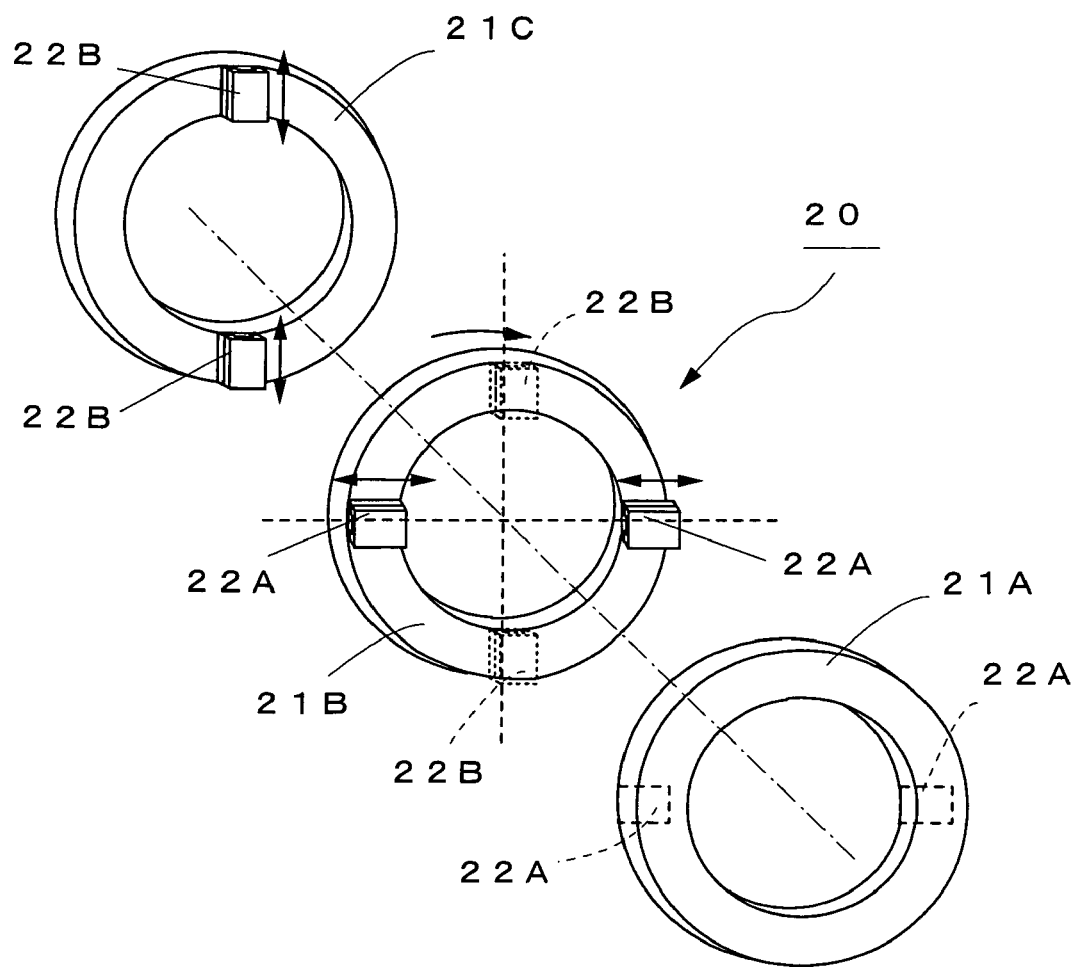
FIG. 5 is a diagram showing the constitution of a flexible coupling.

As shown in FIG. 5, the above flexible coupling 20 comprises a motor-side plate 21A attached to the rotating side case 3b of the motor, a wheel-side plate 21C attached to the wheel 2, an intermediate plate 21B interposed between the above motor side plate 21A and the wheel side plate 21C, and direct-acting guides 22A and 22B for interconnecting and guiding the above adjacent plates 21A and 21B and the adjacent plates 21B and 21C in the radial direction of the disk and interconnects the above motor 3 and the wheel 2. Thereby, the phase difference between the wheel 2 and the rotating side case 3b is minimized to further improve the transmission efficiency of torque from the rotating side case 3b to the wheel 2.

Thus, according to this embodiment, in the vehicle having in-wheel motors, the internal combustion engine 51 is mounted on the front side of the vehicle to drive the front wheels 50F and 50F, the auxiliary driving in-wheel motors 3 are mounted to the rear wheels 50R and 50R on a side where the above internal combustion engine is not mounted to drive the rear wheels 50R and 50R, and the non-rotating side cases 3a of the above in-wheel motors 3 and the knuckles 5 are interconnected by the buffer mechanism 10 comprising (1) the plates 11 and 12 interconnected by the direct-acting guide 15 with springs composed of the direct-acting guide member 13 consisting of the linear bearing 13A and the rod 13B and the spring members 14 and 14 moving in the vertical direction of the vehicle and mated with the direct-acting guide member 13 and (2) the damper 16 for interconnecting the above plates 11 and 12, moving in the vertical direction of the vehicle. Therefore, the above motors 3 can be float mounted to parts around the wheels of the vehicle with a simple structure. Thereby, the sprung mass is increased by the weight of the internal combustion engine on a side where the internal combustion engine is mounted and the mass of the in-wheel motor 3 can function as the weight of a dynamic damper on a side opposite to the side where the internal combustion engine is mounted. Therefore, the running ability and riding comfort of the vehicle having in-wheel motors can be both improved.

Since this buffer mechanism 10 has a small number of parts and is easily assembled, it can be reduced in size while required elastic properties and attenuation characteristics are retained. Consequently, the vertical movement stroke of the in-wheel motor 3 can be fully ensured and the whole structure of the wheel can be reduced in size, thereby making it possible to realize a vehicle having in-wheel motors which is excellent in running ability and riding comfort and has high space efficiency.

In the above embodiment, the buffer mechanism 10 which comprises one direct-acting guide 15 with springs and one damper 16 has been described. The numbers and positions of the direct-acting guides 15 with springs and the dampers 16 are not limited and suitably determined according to the capacity and weight of the motor 3 or the type of the suspension mechanism.

The damper 16 is not limited to the above single rod type damper but may be a known damper which expands and contracts in one direction.

Figure 6:
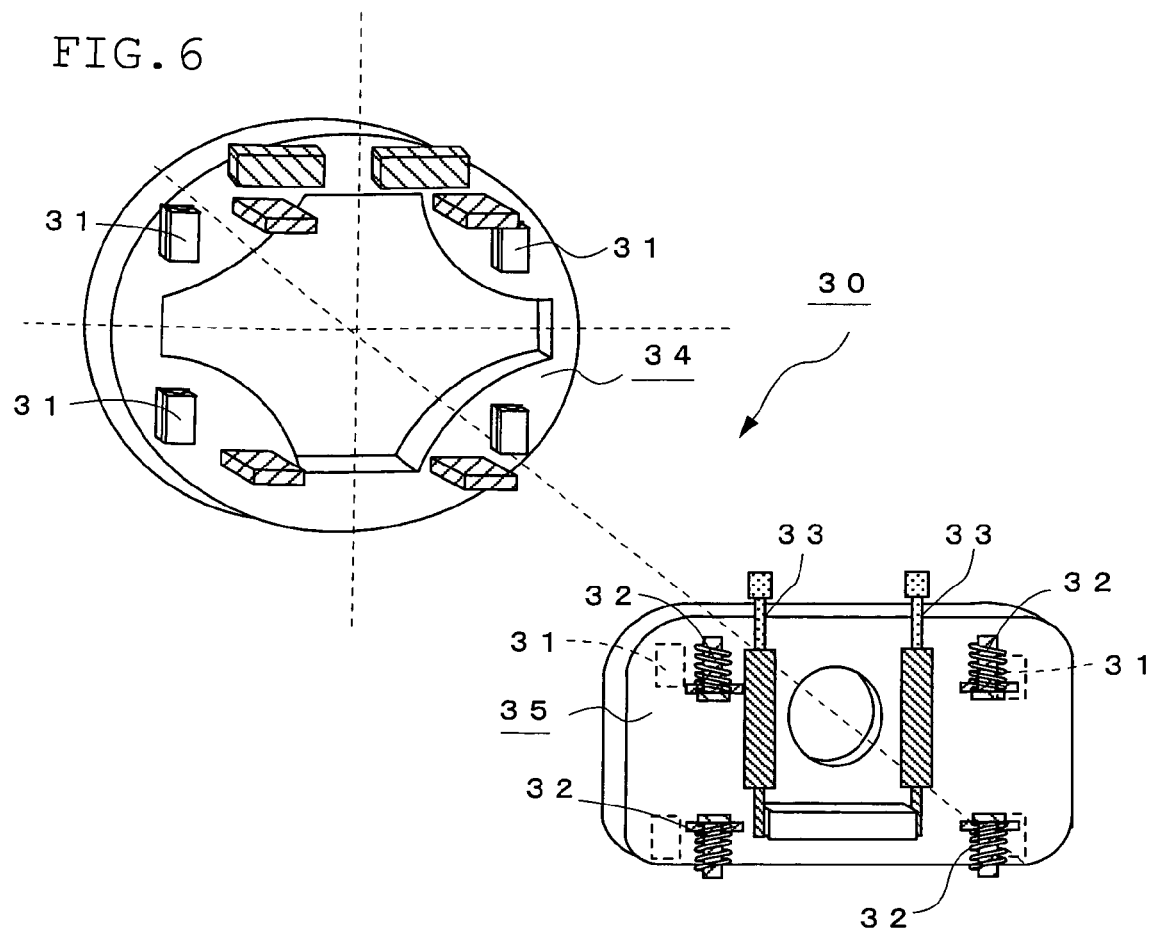
FIG. 6 is a diagram showing the constitution of another buffer mechanism.

The buffer mechanism for supporting the in-wheel motor 3 is not limited to the above buffer mechanism. Even when the non-rotating side case 3a supporting the stator 3S of the in-wheel motor 3 and the knuckle 5 as a part around the wheel are interconnected by a buffer mechanism 30 comprising two plates 34 and 35 whose moving directions are limited to the vertical direction of the vehicle by direct-acting guides 31 and which are interconnected by springs 32 moving in the vertical direction of the vehicle and dampers 33 as shown in FIG. 6, the same effect can be obtained.

Figure 7:
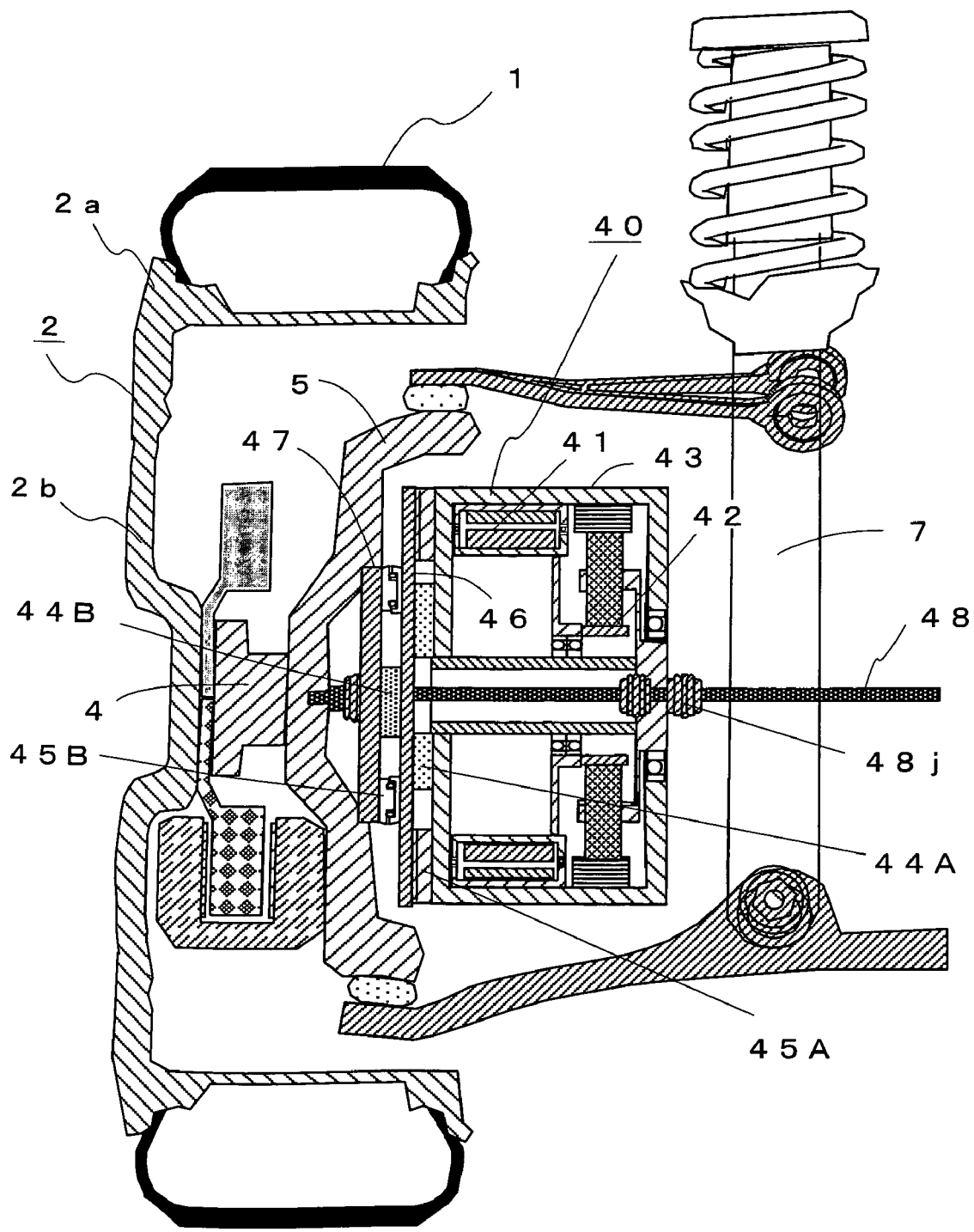
FIG. 7 is a diagram showing a geared motor mounted to the rear wheel.

The in-wheel motor mounted on the rear wheels is not limited to a hollow direct drive motor like the above motor 3 and may be a geared motor 40 which comprises an electric motor 41 and a reduction gear (planetary speed reducer) 42 in a motor case 43 as shown in FIG. 7. To support the above geared motor 40 to the unsprung mass of the rear wheel by an attenuation element and an elastic element, for example, the motor case 43 which is a non-rotating unit of the motor is attached to a hollow disk-like motor attachment member 46 by direct-acting guides 44A for guiding in the vertical direction of the vehicle and elastic bodies 45A, and this motor attachment member 46 is attached to a hollow disk-like knuckle attachment member 47 mounted to the knuckle 5 as a fixing portion by an elastic body 44B and direct-acting guides 45B for guiding in the front-and-rear direction of the vehicle. When the output shaft of the reduction gear 42 and the wheel 2 are interconnected by a shaft 48 having an adjustable joint 48j, the output of the above geared motor 40 can be transmitted to the wheel 2 without fail.

Since the output torque of the geared motor 40 can be made larger than that of the above direct drive motor, the drive force of the vehicle can be further improved.

Figure 8:
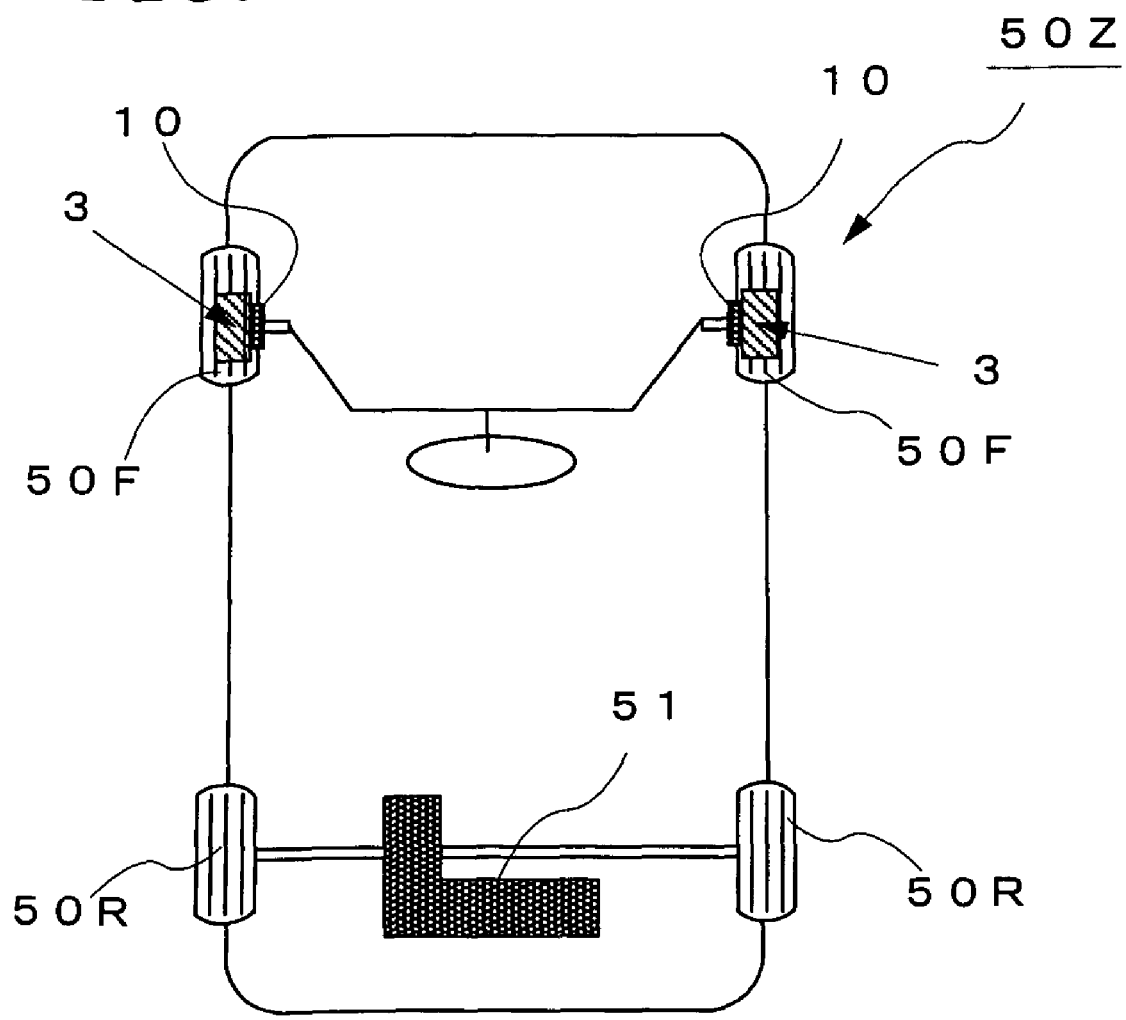
FIG. 8 is a diagram showing the constitution of another vehicle having in-wheel motors according to the present invention.
Figure 9A:
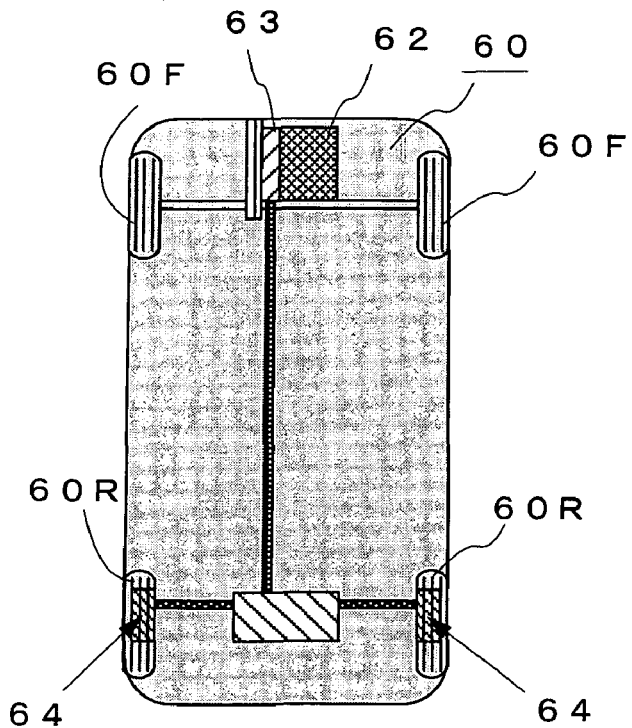
FIGS. 9(a) and 9(b) are diagrams showing a vehicle having rear wheel auxiliary drive motors of the prior art and a motor having a speed reducer to be mounted on this vehicle.
Figure 9B:
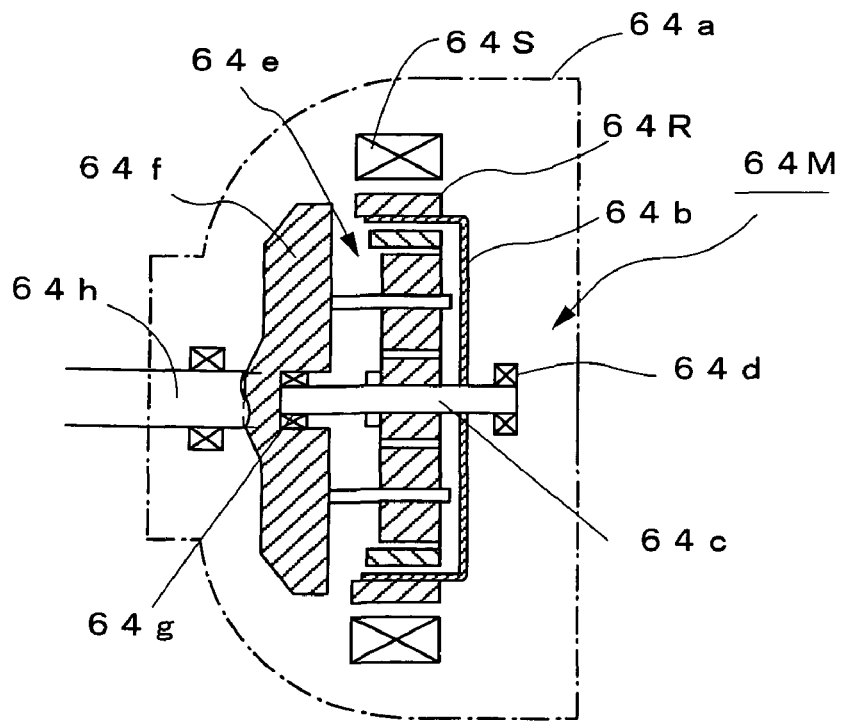
Figure 10:
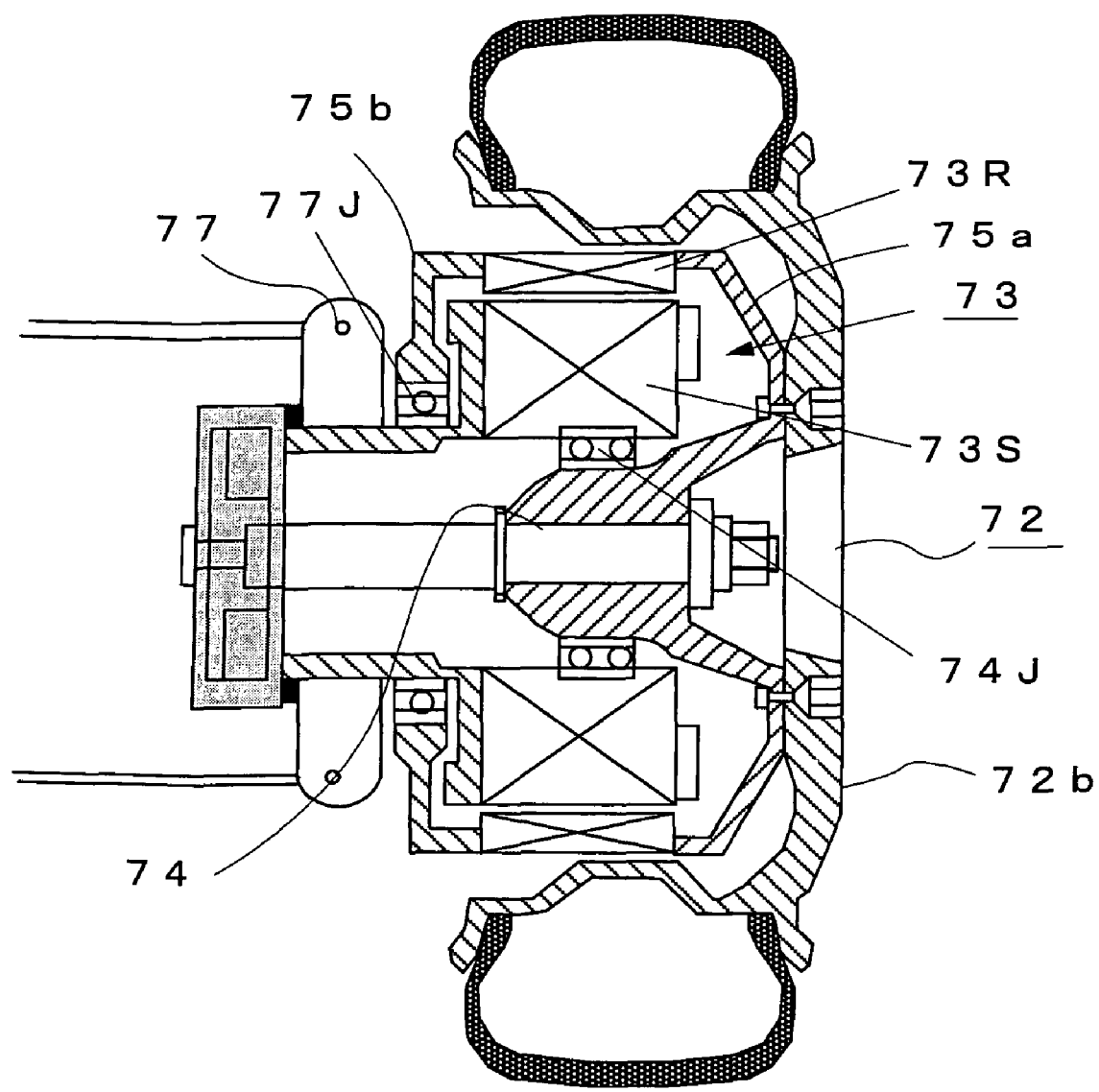
FIG. 10 is a diagram showing the constitution of a direct drive type in-wheel motor of the prior art.

In the above embodiment, the vehicle 50 having rear wheel auxiliary driving motors which comprises the internal combustion engine mounted on the front side of the car body to drive the front wheels and the in-wheel motors mounted to the rear wheels has been described above. The present invention is not limited to this. When the rear wheels 50R and 50R are driven by the above internal combustion engine 51 and the in-wheel motors 3 are mounted to the unsprung mass of the front wheels 50F and 50F through the buffer mechanism 10 even in a vehicle 50Z having an internal combustion engine 51 which is mounted on the rear side of the car body as shown in FIG. 8, the running ability and riding comfort of the vehicle 50Z having in-wheel motors can be both improved.

To drive the wheels on a side where the above internal combustion engine is mounted, the above wheels may be directly driven by torque generated by the above internal combustion engine, or a generator which turns by torque generated from the above internal combustion engine is provided to drive the wheels on a side where the above internal combustion engine is mounted by its generated power.

Power for driving the in-wheel motors may be supplied from a battery, or a generator which turns by torque generated from the above internal combustion engine may be provided to drive the above in-wheel motors by its generated power.

In the above embodiment, the internal combustion engine is used as the main drive source and the above in-wheel motors are used as auxiliary drive sources. The present invention can be applied to a vehicle comprising in-wheel motors as the main drive sources and an internal combustion engine as an auxiliary drive source.

INDUSTRIAL FEASIBILITY

As having been described above, according to the present invention, an internal combustion engine is mounted on the front side of a vehicle to drive the front wheels, in-wheel motors supported to at least one of the unsprung mass of a vehicle and a car body by a buffer mechanism are used to drive the rear wheels, or the internal combustion engine is mounted on the rear side of the vehicle to drive the rear wheels and the in-wheel motors supported to at least one of the unsprung mass of the vehicle and the car body by the buffer mechanism are used to drive the front wheels. Therefore, the running ability and riding comfort of the vehicle having in-wheel motors can be both improved and a vehicle having in-wheel motors with high space efficiency can be realized.

What is claimed is:

1. A vehicle having in-wheel motors, comprising an internal combustion engine for driving the vehicle, mounted on either the front side or the rear side of the car body and electric motors mounted to wheels, the in-wheel motors are mounted to wheels on a side opposite to a side where the internal combustion engine is mounted and supported to either one or both of the unsprung mass of the vehicle and the car body by a buffer mechanism, wherein the buffer mechanism comprises:
(1) a direct-acting guide with springs composed of a direct-acting member comprising a linear bearing and a rod and spring member and spring members and a damper for interconnecting the adjacent plates;
(2) two plates which are interconnected by the direct-acting guide with springs and whose moving directions are limited to the vertical direction of the vehicle; and
(3) a damper for interconnecting the two plates and moving in the vertical direction of the vehicle.

2. The vehicle having in-wheel motors according to claim 1, wherein the two plates are a knuckle attachment plate connected to the knuckle and a motor attachment plate connected to the non-rotating side case of the motor, a fixing member for fixing the linear bearing which is a fixing portion of the direct-acting guide is provided on the knuckle attachment plate, receiving members for receiving the both ends of the rod which is a movable portion of the direct-acting guide are provided on the motor attachment plate to mount the direct-acting guide, and the spring members are interposed between the fixing member and the receiving members.

* * * * *